May 30, 1933. G. H. JENNINGS 1,911,956
WELTING AND METHOD OF PRODUCING IT
Filed Jan. 28, 1932
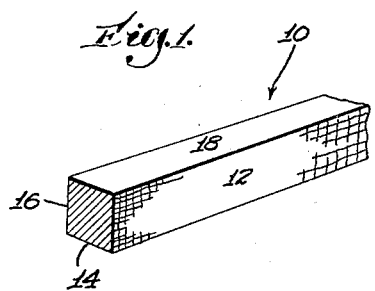
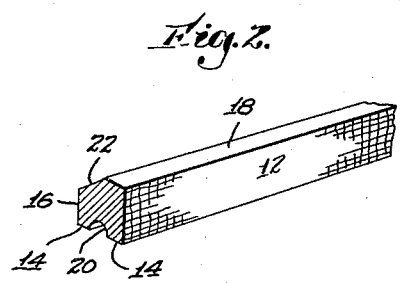
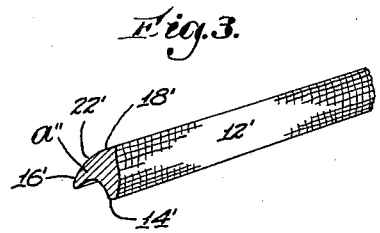
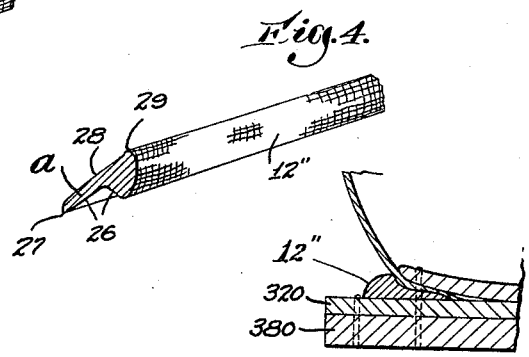
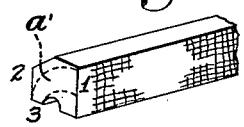
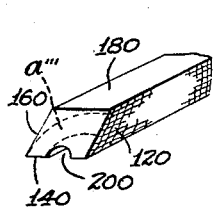
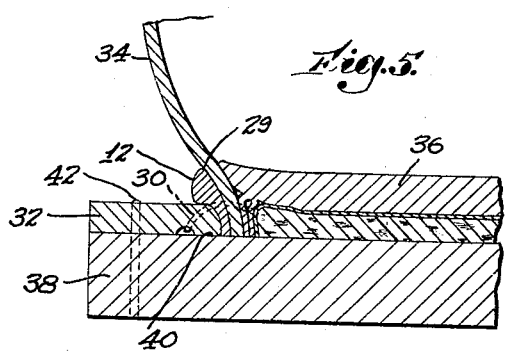
Inventor
George Hollis Jennings
by Everett E Kent
Attorney Patented May 30, 1933

1,911,956

UNITED STATES PATENT OFFICE

GEORGE HOLLIS JENNINGS, OF BROCKTON, MASSACHUSETTS

WELTING AND METHOD OF PRODUCING IT

Application filed January 28, 1932. Serial No. 589,432.

This invention relates to improvements in welting and methods of producing it.

More particularly it is herein described as it may be applied to calk welting, which is ordinarily a strip of leather adapted for constituting a calking bead in the angle between the upper and the Goodyear welt of a shoe, or in a similar location on a shoe of other type.

The desired effect of a welt in the location stated is to fill the said angle with a bead which excludes mud, snow, water and dust, and which presents an outer surface, usually curved in a manner pleasing to the eye, and preferably capable of taking a good finish, which can be reached by the ordinary cleaning agencies.

The present invention can, however, be applied to other welting uses, especially where a strip is to be set with an exposed surface of grain leather between two adjacent joined surfaces.

As applied to Goodyear welt shoes, the calk welting has a depth that must reach inward between the regular Goodyear welt and the upper so as to be pierced and held by the same stitches which secure together the Goodyear welt and the upper. It overlies the inner top part of the Goodyear welt and then curves around the inner top corner thereof and runs down across the inner edge thickness thereof to the plane where the main welt, the bottom edge of the upper, and the edge portion of the inner sole all rest on the top of the outersole. Heretofore, the calk welting used in such cases, when made of a separate strip of leather, has been a strip laid in edgewise, whose width dimension constitutes the said depth. As a considerable part of the width of such a strip will thus become sandwiched between the upper and the main welt of the shoe, it has been the practice to skin the grain face from the inner two-thirds or so of the calking strip, which is thus to be concealed from view, and to arrange the outer one-third or so of the grain face as the finished surface of the calk welt which is to be exposed to view. The portion so removed is so thin and narrow that it is of disproportionately reduced value; but, as it has a grain face, uses can be found for it; and there is an appreciable economy in this procedure. The importance of conserving all grain face portions of leather is well known.

The present invention affords an improvement over the various proposals heretofore made for economical use of leather in the production of calk welting, in that it does not require the taking of an initial strip of leather stock having wider grain face than is ultimately to be exposed in the finished shoe.

The invention accomplishes this by the radical departure of using the thickness dimension of the initial stock to constitute the depth of calk welt, i. e. for running in over the inner part of the main welt, and turning around the top corner of that welt and running down across its inner edge, in the position above described; instead of laying the initial stock strip in edgewise and using its width dimension to run in, over and down. With this new setting, the side of the calk welt which is exposed to view, between the upper and the Goodyear welt, is the grain face thereof, which has the dimension constituting face breadth of the original strip. The original stock strip therefore is made as wide as the desired exposure of face of the calk welt. The breadth of grain face exposure ordinarily desired would have a dimension too great to permit the desirable close lie of the main welt to the upper. And the thickness of the original strip which it is desired to use may be insufficient to reach inward with the desired depth through the sandwich location to the plane above described. The invention provides for the making, out of the original body, of a fin of leather, which reaches superdeeply back inward from the grain face to the desired greater depth (height of fin) than the original thickness of the strip, and with the desired less width (thickness of fin) than the original breadth of the strip. This is done by providing for such a molding of the leather stock strip as constitutes a very complete reshaping of the portion thereof which is back of the grain face, changing it from what may be an originally substantially square cross-sectional form to an L-shaped form, of finished welting, in which the whole of the original grain face, and the stock immediately backing it, constitutes the exposed or bead part of the welting, corresponding to the bottom flange of an L. As the face of this bead may be considerably narrower than the depth of the fin, which must reach in between the main welt and upper, to receive the stitch, there is a saving in width of grain face necessary to be taken in the original stock, as compared with prior practice where the original strip is to be inserted edgewise. If necessary, a somewhat greater thickness of original stock may be taken, but, if so, this is a feature of little consequence as it adds disproportionately little to the cost of the stock.

As a preliminary step toward the molding of the fin of superdepth, the invention provides for roughly shaping such a fin of greater depth within the original unmolded body of leather, by cutting a groove in one edge and chamfering a corner on the opposite edge, of the original strip, so as to outline a residual body of stock in the shape of a curved tongue which has a curved length exceeding the thickness dimension of the original strip;—which curved tongue is then by a molding process converted into the straight fin.

In practice the invention is very simple, merely involving the running of the stock strip through successive apparatus, which shape it by cutting, soften it by liquid absorption, and mold it by pressure of die wheels; and so convert it to the desired beaded strip form of welting, with the full grain leather area preserved and surfacing the bead.

It is a feature that this improved welt can be made waterproof, by suitable methods already known, as by suitable tanning, or by subsequent treatment, whereas waterproofing is not practicable for styles of welting whose construction depends upon the cementing of laps or flaps in its surfaces. The welting of the invention has such a narrow grain face that it can be cut from a hide spirally in a long continuously integral strip.

It is another feature that, by the compressing and molding, my improved welt is made more dense of body than has been usual, and is more than normally strong at the thin fin portion through which the stitches will pass.

Also, the grain face is not necessarily bent into a curve of such small radius as heretofore, but can terminate abruptly at each end. This makes a more complete filling of the throat between the Goodyear welt and the upper, the grain face of the welt making an abrupt approach to each. The shape of the welt face can, however, be molded very much as may be desired.

Another feature is that as the stock in the exposed portion of the calk welt, underlying the grain face, is not much distorted from its original shape, this part of the calk welt is free from tendency to assume some former shape, and does not have to be "locked." And if by chance it were to spring back somewhat toward original shape, that would be merely a filling more tightly of the angle between the Goodyear welt and the upper, with no effect on the sales value of the shoe or the pride of the owner.

It is intended that the patent shall cover by suitable expression in the appended claims, whatever features of patentable novelty exist in the invention disclosed.

In the accompanying drawing:

Figure 1 represents the initial stock, being a preliminary strip of leather which, by the method of the invention, is to be made into beaded calk welting;

Figure 2 shows the strip, in process, after part of the body has been removed by excision;

Figure 3 shows a subsequent intermediate stage, after a molding of the shape of Figure 2;

Figure 4 represents my finished welting strip, being that of Figure 3 further molded;

Figure 5 shows the welting embodied as a calk welt in a shoe;

Figure 6 is a theoretical diagram;

Figure 7 is a modified form, comparable to Figure 2;

Figure 8 shows my welting applied as a calk welt on a McKay shoe, being a cross-section through a fragment of the shoe;

Figure 9 illustrates a strip shape into which leather stock may be cut by a single operation, using a cutter of suitable shape, being a modification of the step and shape of Figure 1;

Figure 10 illustrates another modified shape of strip attainable by a single initial cutting operation corresponding to Figure 1; and Figure 11 shows the strip of Figure 10 after a further cutting operation, for the step corresponding to that of Figure 2.

Referring to the drawing, the initial or preliminary strip of leather 10 of Figure 1, herein called the stock, may be substantially square in cross-section, having the grain face 12; the flesh face 16; and the two edges, 14 and 18, which are comparable to flesh faces of leather rather than to grain faces, and which are herein at times for convenience referred to as flesh edges or flesh faces.

An important feature is that the width of the grain face 12 need be only enough to arch across the throat or angle between the Goodyear welt and the upper, as seen in Figure 5. While this may vary somewhat, according to the distance to which it is desired that this calking shall project from the seam of stitches 30, it is a radical departure in permissible shape of stock, where all of the exposed surface is to be grain. However, any of various width of finished face can be made from a stock strip of given width, by using molds of suitable shape. The width of initial stock strip may approximate the saving of only half the width of grain face which has been in the strips of stock used heretofore. Consequently, in computing costs, there will be considerably less area of grain leather to be purchased, per unit of length of completed calk welting.

The strip 10, if made in square cross-section, contains more body of leather than is needed for constituting the fin a, Figure 4. While it is conceivable that, with the stock being made sufficiently plastic, it would be possible to mold the form of Figure 1 into that of Figure 4, I prefer to eliminate some material, preliminary to the molding; and so I cut a groove 20 in a flesh edge 14 which is adjacent to the grain face; and also I chamfer the opposite flesh edge, at 22, adjacent to the flesh face 16, Figure 2, leaving a suitable body of leather to make up the ultimate compacted body of the welting. In Figure 6 is reproduced the shape of Figure 2, with a dotted indication of a theoretical tongue $a'$ which lies therein. It is clear that the dotted curved length from surface 1 around to surface 3 is greater than the straight length from 1 to surface 2. The latter is the thickness of the original stock strip. The curved tongue $a'$ is to be developed as the straight fin $a$, Figure 4. This may be done both by the mere straightening of the curve $a'$ with incidental compression, and/or additional to that, by the reshaping of the stock, so as to make some of it be at a further distance than it originally was from the grain face.

The strip of Figure 2 is then to be soaked or otherwise specially treated so as to be rendered soft and workable, and, when in temper, to be molded into a new form which becomes permanent. This treatment may involve the running of the strip through a tank of water to which has been added some substance which will have an effect expediting the water into the leather. Solutions having this effect are already known in the shoe industry. Water soluble oils, sulphonated oil, water solutions of shellac or casein and soap solutions are all examples of mixtures which will serve. The strip may pass through the solution quickly, taking up only a small quantity of it, but the subsequent physical or chemical action within the strip disperses the moisture through the leather and the whole body is made soft and workable. When the strip is well mulled and is "in temper", and is in process of drying out, it is ready for the molding of the present invention.

I prefer to effect the molding in two steps, in each of which the strip is run between a pair of wheels having die faces which, by pressure simultaneously with traction, reshape it to the forms of their respective faces. First the strip of Figure 2, when in temper, is subjected to a molding compression which partially forms the welting as seen in Figure 3, where the grain face is $12'$; and 18, 22 and 16 are at $18'$, $22'$ and $16'$ in process of being merged into a side 28 of the ultimate fin $a$, while the side 14 and its groove 20 are in process of becoming the very much altered surface 26, and the fin $a$ is seen crudely emerging as $a''$. Then the strip of Figure 3, still in temper, is run through a set of wheel molds which bring it to the desired final shape of beaded welting, of which Figure 4 is an example, in which shape it is allowed to dry. As there represented, the grain face $12''$ is curved in the finished surface form desired for the area of bead which will be exposed in a shoe; and with the body portion of stock, between 26 and 28, condensed by the pressure, and reshaped to the desired fin form. Upon drying, the whole becomes set in the new shape which continues permanently.

My improved calk welting involves a very considerable saving in production costs, for material, over welting made from grain leather according to previously known methods. Also, it has a body structure which throughout is more dense and strong than would characterize ordinary leather if cut to the same shape, surpassing any previous calk welting of which I am aware. In consequence, the relatively thin fin portion, through which pass the retaining stitches 30, is well able to withstand all strains incident to its insertion and use.

In Figure 5 the main or Goodyear welt is marked 32, the upper 34 and the innersole 36, the outer-sole 38 having a top surface plane 40 against which all of these last mentioned parts rest, being secured by stitches 42.

In the molding process it is convenient to have the wheel dies so shaped as to produce a terminal hump 29 at the corner where the surface 28 joins the grain face $12''$. This contributes to the making of a snug fit of the top of the calk against the adjacent surface of the upper, as seen in Figure 5.

The initial stock strip is not necessarily cut with its flesh edges 14 and 18 at right angles to the grain face 12, as in Figure 1. A modified shape for this initial stock strip is indicated in Figure 7, where the grain face is 120, the flesh face 160 and flesh edges are cut at an angle obliquely to them. The sketching of the theoretical tongue $a'''$, comparable to $a''$ of Figure 6, shows a still greater length of stock in natural condition available for being made into the fin $a$; and in this case the lines of the theoretical tongue lie so close to surfaces 160 and 180 that the chamfering corresponding to 22 can be omitted, and with the cutting of a suitable groove 200 the resulting structure does not have an undue thickness of adjacent stock to be compressed into the fin. The product of this may be substantially the same in shape as Figure 4, or such variation of that as may be desired, but with a longer fin made from initial stock of a thickness equal to that of Figure 1.

Another use of the product is illustrated in Figure 8. This is also a calk welting and it is shown applied to a McKay shoe. In this figure the outer sole 380 is of rubber composition, to which is sewed a doubler 320 around the edge of which is fastened, by stapling, sewing or otherwise, a strip of calk welting made as above described, upon which will be fastened the upper of the shoe. The calk welting may be applied either side up, and is here represented as applied upside-down from the position illustrated in the other figures.

Owing to the narrowness of the grain face, and the relation of the fin to it, the original stock strip can be cut spirally from a hide and yet be possessed of the necessary flexibility for running around a shoe. It thereby becomes commercially practicable to make the welting waterproof, which is the first time this has become possible, it is believed, as all previous commercial welting for modern methods of manufacture of shoes has contained either laps or flaps held together by cement; and an effort to waterproof such will open the laps. On the other hand, stock cannot be pre-waterproofed because with such a change in the quality of the stock cementing would then become an impracticably slow and expensive procedure. A stock strip thus spirally cut can be integrally continuous for a great number of yards, and can be waterproofed by methods already known, and thereby will become substantially more valuable as a calking welt.

Although the cutting of the leather stock into a strip, and the shaping of the strip by grooving and chamfering, are above described as separate processes, they can both be done in what is substantially a single operation. Thus, by using a cutter of proper shape the stock strip may be initially cut with the cross sectional shape shown in Figure 9 or Figure 10 (a shape which is represented different from that of Figure 1, for purpose of further illustrating the possibilities of the invention) and may pass immediately another cutter which reduces it by the desired further trimming, as, to the shape of Figure 11, to be later mulled and molded as above described. In each of these cases the toe of the stock, corresponding to that between surfaces 14 and 16 of Figure 2, extends the further because of the integral retention of the triangular cross sectional strip which was cut away to make the chamfered surface 22 of Figure 2. When subsequently molded to the position of Figure 3, the fin in each of these cases extends even further from the grain face, than when molded from the form of Figure 2; and this permits the use of a thinner hide stock for getting a fin of equal depth. The cutting in the shapes of Figures 10 and 11 may be accomplished by suitably shaping and setting the blade which pares successive portions from the edge of the sheet leather stock, whether the path of the cut be spiral or straight.

I claim as my invention:

1. The method of producing a welting strip, comprising the cutting of a groove in a lateral face of a stock strip of leather which has a grain face, and then while leaving that grain face to constitute the bead, with the material which closely underlies it, reshaping that substance of the strip which is more remote from the grain face by expanding said groove, pressing and bending that substance into a fin which retreats from the grain face to a distance exceeding the original thickness dimension of the stock strip.

2. The method of producing a beaded leather welting, having a relatively thin fin and a relatively broad grain-faced bead, comprising the cutting of leather into a stock strip having width of grain face equal to the arcuate extent of the bead of the finished welting, and having a substantial thickness; softening the stock; and molding the stock, while in temper, to the finish shape of the beaded welting, with the said grain surface left as the face of the bead, and with the stock underlying the grain formed into a bead and a fin extending backward from the bead, in the direction of original thickness of the stock.

3. The method of producing a beaded welting strip comprising, in a strip of leather having grain face and flesh face, the cutting away of between-substance and flesh face thereof on a bevel from mid-thickness of the strip to the flesh face, thus obtaining an increased superficial dimension from grain face to flesh face along said bevel, and then by compression and bending, reshaping the stock having this greater surface dimension into a fin extending backward from the grain face to a greater distance than the original thickness of the leather.

4. The method of producing a beaded welting strip of leather, comprising the cutting of leather into a strip having a grain face and parallel edges extending back from the grain face, with a portion of stock being cut out from one of said edges of the strip; and the compressive molding of a part of the stock which remains, back of the grain face, into a fin which extends backward from the face and comprises stock that in the original strip lay along the flesh face and along the other of said edges.

5. The method of producing a beaded welting strip of leather comprising the cutting of leather into a strip having a grain face; and the molding of a fin in that strip by moving stock, originally lying in a zone extending from one edge portion of the grain face of said strip to the flesh face of that strip at the rear of the other edge portion of the said grain face; the said moving being from said original position into a fin position at the rear of the first-mentioned edge portion of the face.

6. The method of producing a beaded welting strip of leather wherein stock in a leather strip, having approximate equality of depth and of breadth of grain face, is trimmed on one edge face to form a groove, and trimmed on its other edge face to a bevel toward the flesh face, and is then compressively molded, as regards material back of the grain face, at and beyond the location of said groove into a fin, of whose surface the groove wall and said bevel become parts, said fin having greater depth and less breadth than the stock which finally composes said fin had in the original strip.

7. The method of producing a beaded welting strip of leather, wherein stock lying back of the grain face of a strip of leather is cut away, making an edge groove in the strip, thus reducing the mid-strip dimension of between-substance parallel to the grain face; and then compressively molding the residue; and in the said molding transferring a zone of that stock, which originally ran from one edge of the grain face backward obliquely to the opposite edge of the corresponding flesh face, and of whose edge surface a portion of the wall of said groove is a part, into a zone position running directly backward from the said edge of the grain face and leaving a hollow directly behind the other edge of the said grain face, the other portion of the wall of said groove remaining as a part of the surface of this hollow, and constituting the back of a part of the bead.

8. The method of producing a beaded welting strip of leather, comprising the cutting from leather of a stock strip having a grain face and having substantial thickness; treating the stock strip with a softening liquid; transforming and transposing flesh-face leather, by molding pressure, from its original state and position underlying said grain face, to a condensed state and fresh position constituting the fin portion of the welting strip; and forming the bead portion thereof from the stock surfaced by the grain leather; and permitting the molded strip to dry in the permanent beaded welting strip form.

9. The method of producing a beaded welting strip of leather, comprising the cutting from leather of a stock strip having substantially rectangular cross-section, and having a grain face; excising a groove in a flesh edge, treating the grooved strip with a softening liquid; reshaping the strip by molding pressure in the direction of the groove and turning its flesh-face wall into a fin extruding back from the grain face.

10. A beaded welting strip made of leather wherein the material of the entire body is in a condensed condition, as compared with the natural state of the leather, and consists of a bead, with grain face adapted to constitute the whole of the exposed face of the strip when in use, and a fin extending from that bead with direct backward integral connection to the whole of the body portion of the bead; the material of said fin being transposed from its natural position, with respect to the part of the bead to which it is directly connected, to a shape and position asymmetrical with respect to the body of the bead.

11. A beaded welting strip made of leather wherein the material of the entire body is in a condensed condition, as compared with the natural state of the leather, and is in the general shape of an L, with the grain face on the long face dimension of the flange thereof.

12. A calk welting strip made of leather having a bead portion with surface of grain leather and having a narrower body portion behind the bead comprising material which in a natural state lay immediately behind the said body of material having the grain surface but which is condensed in a general direction of parallelism to the grain face and is extended obliquely therefrom.

13. A calk welting strip made of leather comprising two integral parts, one of which is a bead comprising stock and grain face thereof approximately in their natural relations, and the other of which comprises stock and flesh face thereof distorted from their natural relations to the portion of the material of the bead to which this part is directly connected and constituting a fin extending backward obliquely from the bead.

14. Calk welting having a bead and fin combined in L-shape, wherein the flange of the L is the bead and has grain face on the long side of the flange of the L for extending from the upper to the underlying exposed part of a shoe, and the fin has flesh leather for extending between and attachment to those two parts of the shoe; and, at that edge of the bead which is at the angle of the L, there is a ridge of the bead continuing its grain face slightly beyond the body of the fin.

15. Calk welting comprising a strip of leather which is continuously integral for a multiplicity of yards of length, has a grain leather faced bead, and has a fin projecting obliquely thence narrower than the bead and adapted for attachment to a shoe.

16. A new article of manufacture comprising a calk welting strip made of waterproof leather and extending integrally for a multiplicity of yards of length, having a bead wholly of grain leather, and an oblique fin wholly of flesh leather.

17. A new article of manufacture comprising a calk welting strip having a bead whose exposed face is wholly of grain leather and a fin wholly of flesh leather, one side of which projects directly and with immediate integrality from one edge of the grain face of said bead, and the other side of which projects from the other edge of said grain face but does so only indirectly because of there being an open re-entrant angle between the body of the projection and the body of the bead where this side of the fin leaves said grain face.

18. The method of producing a beaded welting strip of leather, comprising the cutting of a strip of leather containing a portion of grain face and a parallel portion of the flesh face of a parallel sided sheet of leather such as a hide is, and then reshaping the leather stock of that strip adjacent to said flesh face by a molding process involving the compressing and simultaneously the bending thereof from its natural position relative to the grain face into a welting fin which extends further from the grain face than the natural position of the stock comprising this fin.

Signed at Boston, Massachusetts, this thirteenth day of January, 1932.

GEORGE HOLLIS JENNINGS.